(12) United States Patent
Amirijoo et al.

(10) Patent No.: US 9,578,524 B2
(45) Date of Patent: Feb. 21, 2017

(54) METHOD, DEVICE AND PROGRAM FOR VALIDATION OF SLEEPING CELLS IN A COMMUNICATIONS NETWORK

(75) Inventors: Mehdi Amirijoo, Linköping (SE); Tamas Borsos, Budapest (HU); Jing Fu, Solna (SE); Tomas Jonsson, Linköping (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 14/426,229

(22) PCT Filed: Sep. 7, 2012

(86) PCT No.: PCT/EP2012/003766
§ 371 (c)(1),
(2), (4) Date: Jun. 5, 2015

(87) PCT Pub. No.: WO2014/037021
PCT Pub. Date: Mar. 13, 2014

(65) Prior Publication Data
US 2015/0312782 A1  Oct. 29, 2015

(51) Int. Cl.
*H04W 24/04* (2009.01)
*H04W 52/02* (2009.01)
(Continued)

(52) U.S. Cl.
CPC ............. *H04W 24/04* (2013.01); *H04W 24/00* (2013.01); *H04W 52/0206* (2013.01);
(Continued)

(58) Field of Classification Search
CPC ...... H04W 24/04; H04W 24/08; H04W 24/00; H04W 24/06; H04W 68/00; H04W 68/005
See application file for complete search history.

(56) References Cited

U.S. PATENT DOCUMENTS

| 6,256,490 B1 | 7/2001 | Yost et al. |
| 2010/0234006 A1 | 9/2010 | Vadlamudi |

(Continued)

FOREIGN PATENT DOCUMENTS

| CN | 101594622 A | 12/2009 |
| CN | 102281555 A | 12/2011 |

(Continued)

OTHER PUBLICATIONS

"Potential Solutions for Self Healing," Huawei, 3GPP TSG-RAN WG3 #75, R3-120128, XP050566499, Feb. 6-10, 2012, pp. 1-3.*
(Continued)

*Primary Examiner* — Nam Hyunh
(74) *Attorney, Agent, or Firm* — Myers Bigel, P.A.

(57) ABSTRACT

A method for detecting a malfunction in a cell of a telecommunication network is disclosed. The cell is adapted to serve a plurality of user devices identified by user identities and to handle signaling and/or data traffic between the network and the user devices. A lack of traffic is detected in the cell. Further, at least one user identity which identifies a user device is selected. The selected user device is served by the cell. Then a paging message is sent to the user device which is identified by the at least one selected user identity. Finally the malfunction of the cell is validated in case no response message is sent by the user device to said paging message.

18 Claims, 5 Drawing Sheets

(51) Int. Cl.
*H04W 24/00* (2009.01)
*H04W 68/00* (2009.01)
*H04W 88/00* (2009.01)

(52) U.S. Cl.
CPC .......... *H04W 68/005* (2013.01); *H04W 68/00* (2013.01); *H04W 88/005* (2013.01)

(56) References Cited

U.S. PATENT DOCUMENTS

| | | | |
|---|---|---|---|
| 2011/0037601 A1 | 2/2011 | Kumar et al. | |
| 2014/0211638 A1 | 7/2014 | Huang | |
| 2015/0312782 A1* | 10/2015 | Amirijoo | H04W 24/00 455/424 |

FOREIGN PATENT DOCUMENTS

| | | | |
|---|---|---|---|
| CN | 102388644 A | 3/2012 | |
| EP | 1 638 253 A1 | 3/2006 | |
| EP | 2 568 734 A1 | 3/2013 | |
| SE | WO 2013191600 A1 * | 12/2013 | ............ H04W 24/04 |
| WO | WO 2011/157164 A1 | 12/2011 | |
| WO | WO 2012/005633 A1 | 1/2012 | |

OTHER PUBLICATIONS

International Search Report and Written Opinion of the International Searching Authority, PCT Application No. PCT/EP2012/003766, May 21, 2013.

\* cited by examiner

METHOD, DEVICE AND PROGRAM FOR VALIDATION OF SLEEPING CELLS IN A COMMUNICATIONS NETWORK

CROSS REFERENCE TO RELATED APPLICATION

This application is a 35 U.S.C. §371 national stage application of PCT International Application No. PCT/EP2012/003766, filed on 7 Sep. 2012, the disclosure and content of which is incorporated by reference herein in its entirety. The above-referenced PCT International Application was published in the English language as International Publication No. WO 2014/037021 A1 on 13 Mar. 2014.

TECHNICAL FIELD

The present disclosure generally relates to validation of sleeping cells in a communications network. A technique is described for validating that a cell is indeed in sleeping mode so that issuing of false alarms is avoided. The technique may be implemented as a method, a computer program product, a network node or a network system.

BACKGROUND

If a malfunction occurs in a mobile network the standard procedure is that the responsible network element reports it to the Operations Support System (OSS) of the mobile network in the form of an alarm. The network element also indicates the cause of the malfunction, if this is available. There are, however, malfunctions that have no explicit sign or cause. These cases may be relatively easy to observe and identify but the detection of the error or malfunction requires advanced techniques and preliminary analysis of the network events prior to or during the occurrence of the error or malfunction.

A common example of such a malfunction which can occur in a mobile network is called "sleeping cell". A sleeping cell is a cell which is not functioning properly, in the sense that it cannot properly serve the mobile devices which are in its coverage area. The malfunction can have an impact on the whole cell functionality, i.e. no mobile device can contact the network through the given cell. It may also be a partial functionality malfunction e.g. a mobile device may be able to use the signalling channels but not be able to send/receive IP data packets. Since the symptoms of a sleeping cell can be very diverse and mostly only visible through the traffic statistics, there is no single detection mechanism that can provide a fully reliable validation about the health of a cell.

There are different solutions existing on how to validate if a cell is a sleeping cell. US Patent Application US20100234006 describes the use of the number of RRC Requests and the success rate as an indicator for a sleeping cell.

US Patent Application US20110037601 describes a distributed detection algorithm where the sleeping cell validation is supported by alarms received from the neighbour cells.

EP1638253 and CN101594622 describe statistical approaches where cell performance is compared to a predefined threshold or historical performance to detect any abnormal behaviour.

CN102281555 proposes a solution for the validation of the erroneous state of a cell by sending a special type of "broadcast" paging message in the cell and observe if any mobile device is responding to this broadcast paging message. The "broadcast paging" also includes a detection indication information and pages all mobile devices in a given cell. In practical realization this requires extensive standardization effort, since the current 3GPP standards do not support this kind of "detection indication". Furthermore, the cell broadcast paging is not usable for forcing a mobile device to send any signal to the base station but only to update its system information by re-reading the cell broadcast channel.

CN102388644 describes the usage of a dedicated function in the base station to simulate a "test user" to see if the cell behaves normally. The main drawback of this solution is that a simulation cannot cover all potential errors. In fact, since the errors are far from being trivial (otherwise there would be an alarm for it), it is very likely that the problem remains hidden. Moreover, the error can be outside the simulation scope, e.g. some hardware, antenna problem.

All the solutions described above also require as much verification as possible to avoid false alarms. This makes their execution cumbersome and still the validation of a sleeping cell is not guaranteed.

SUMMARY

In general, there is a need for validating if a cell is sleeping which ensures that no false alarms are issued due to wrong judgement on if a cell is sleeping or not.

A method for detecting a malfunction in a cell of a telecommunication network is proposed. The cell is adapted to serve a plurality of user devices identified by user identities and to handle signaling and/or data traffic between the network and the user devices. A lack of traffic is detected in the cell. Further, at least one user identity which identifies a user device is selected. The selected user device is served by the cell. Then a paging message is sent to the user device which is identified by the at least one selected user identity. Finally the malfunction of the cell is validated in case no response message is sent by the user device to said paging message.

In an embodiment, a detecting device for detecting a malfunction in a cell of a telecommunication network is also proposed. The cell is adapted to serve a plurality of user devices identified by user identities and handling signaling and/or data traffic between the network and the user devices. The device comprises a detector adapted to detect a lack of traffic in the cell and a selector which is adapted to select at least one user identity identifying a user device. The user device is served by the cell. The detecting device further comprises a paging controller adapted to send a paging message to the user device identified by the at least one selected user identity. Further the detecting device comprises an actuator adapted to validate the malfunction of the cell in case no response message is sent by the user device to said paging message.

BRIEF DESCRIPTION OF THE DRAWINGS

Further aspects, details and advantages of the technique presented herein will become apparent from the following description of exemplary embodiments in conjunction with the drawings, wherein.

DETAILED DESCRIPTION

In the following description of exemplary embodiments, for purposes of explanation and not limitation, specific details are set forth like specific flowcharts or architectural diagrams in order to provide a thorough understanding of the invention presented herein. It can be apparent to one skilled in the art that the invention may be practised in other embodiments that depart from these specific details.

Moreover, those skilled in the art will appreciate that the services, functions and steps explained herein may be implemented using software functioning in conjunction with a programmed microprocessor, an Application Specific Integrated Circuit (ASIC), a Digital Signal Processor (DSP) or a general purposes computer. It will also be appreciated that while the following embodiments will primarily be described in the context of methods and devices, the technique presented herein may also be embodied in a computer program product as well as in a system comprising a computer processor and a memory coupled to the processor, wherein the memory is encoded with one or more programs that may be adapted to perform the services, functions and steps disclosed herein.

The invention described below is generally directed to validating if a suspected cell is indeed sleeping so that issuing of false alarms is avoided.

Figure 1:
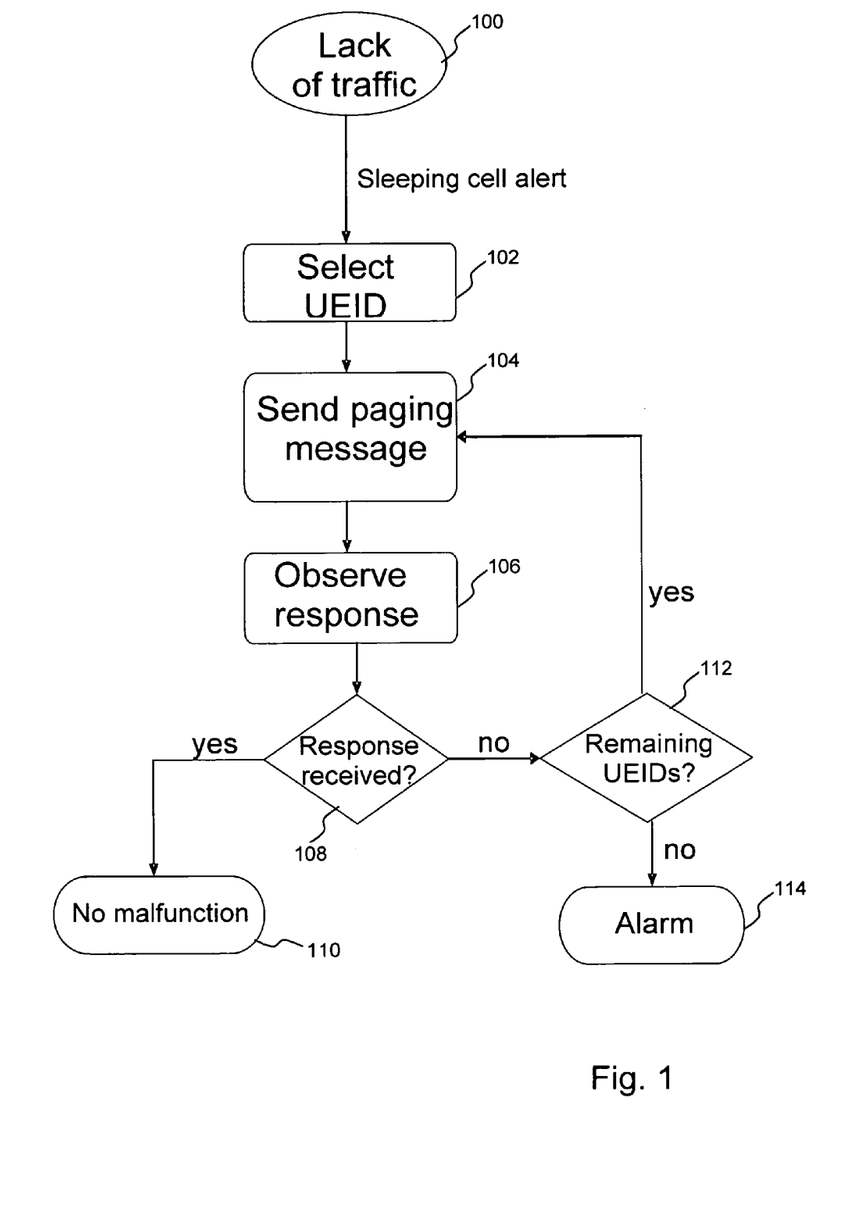
FIG. 1 shows a flowchart of the proposed method.

FIG. 1 shows a flowchart of the main method for the validation process of a sleeping cell according to the invention. The process starts in step 100 with the detection of a lack of traffic on a cell. The entity which detects this lack of traffic issues a sleeping cell alert. The issuing of the alert can also be performed by this entity can be for example a sleeping cell detector. The lack of traffic can be either lack of signaling traffic or lack of data traffic or both. One possible way to detect a lack of traffic can be if an access channel is not used by a mobile device for a certain amount of time. A more detailed description of the detection method goes beyond the scope of this invention and will not be discussed in more detail.

In step 102, a user identity is selected. This user identity uniquely identifies a user device which is served by the suspected sleeping cell. Since it has not yet been validated that the cell is sleeping, the cell is called suspected sleeping cell. The user identity can be part of a list of user identities. This list may comprise a number of user identities which identify mobile devices which are most likely to be served by the cell. This selection can be made by a user identity selector. Alternatively, more than one user identities can be selected in step 102. In step 104 a paging message is sent to the one or more user devices identified by the one or more user identities which have been selected in step 102. The sending of the paging message can be controlled by a paging control function implemented in the user identity selector. In step 106 there is a continuous observation of the traffic going on over the cell. If there is detection of a response from any of the paged mobile devices, step 108, the sleeping cell validation stops and the cell is declared to not be a sleeping cell or in other words, to not have a malfunction, step 110. In this way a number of false sleeping cell alarms can be filtered out. If there is no response sent from the paged mobile devices and there are still mobile devices in the list which have not been paged, step 112, then the procedure described before continues from step 104.

If all the mobile devices which have been paged do not send a response, the procedure concludes that it was not possible to disprove the sleeping cell hypothesis. In that case further actions are taken like, for example, issuing an alarm in step 114. A further action can be the restart of the radio base station which controls the cell.

Figure 2:
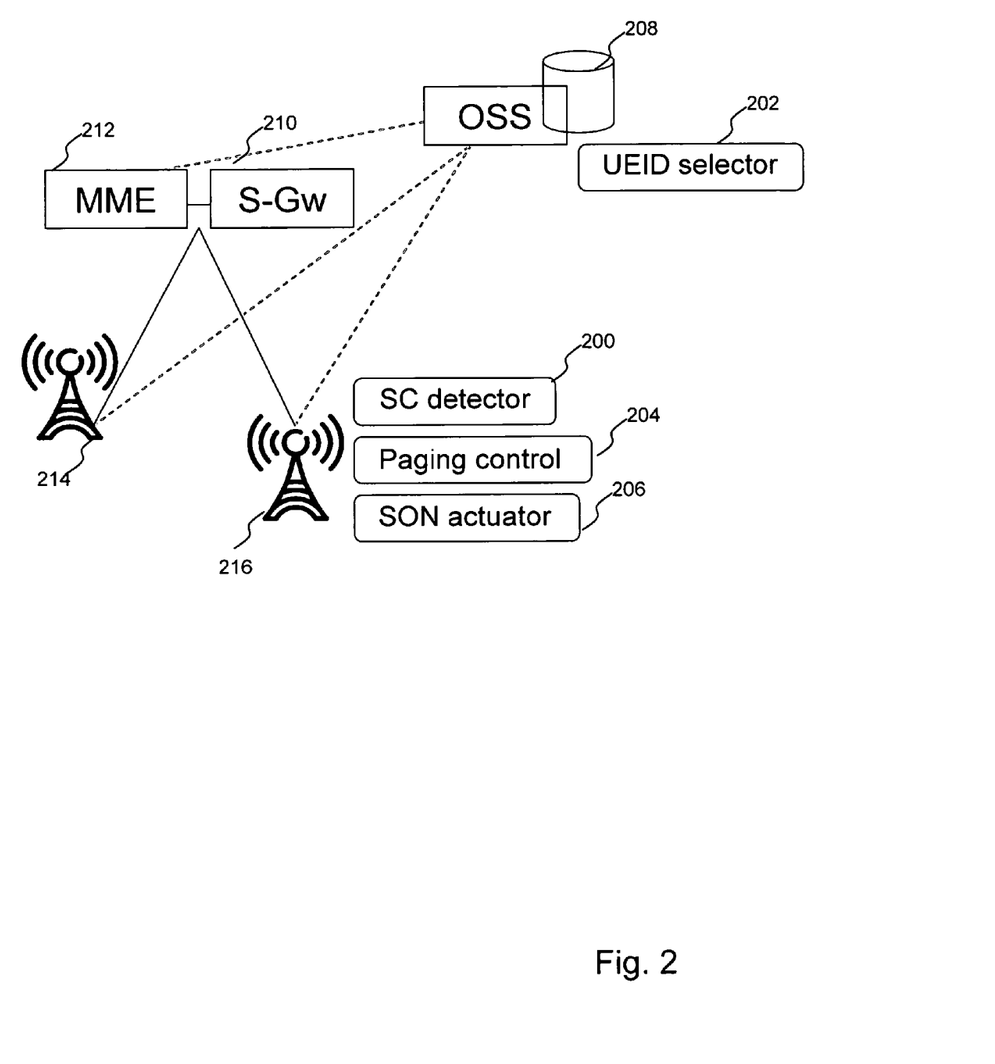
FIG. 2 shows an architectural embodiment based on an RBS.

Three different architectural embodiments will be presented below. The first one is based on a Radio Base Station (RBS) 214,216 implementation as shown in FIG. 2. There are four functional blocks implementing the solution as presented in FIG. 2. The sleeping cell (SC) detector 200 is a function which is responsible for continuously observing the traffic and indicating if the traffic level is zero. The traffic level can be measured in terms of signaling or user data traffic. The actual algorithm resulting in sending a sleeping cell alert is not part of this invention and it can use any heuristics, information about the immediately preceding traffic levels, historical traffic level data in the given cell, predefined thresholds, etc. An algorithm indicating a sleeping cell based on zero observed traffic for a certain time period is always a heuristics since it can happen that for the given time all the mobile devices in the coverage area of the cell are not active or in idle mode. The heuristic decision can be further justified by the presented invention to avoid false alarms, which can even end in a false restart of the RBS hardware.

The SC Detector functionality can be placed in the RBS 214, 216 or the OSS. The advantage of having it in the RBS 214, 216 is that the RBS can observe the signaling and/or data traffic directly on many protocol levels to make a sophisticated decision and also the reaction time to send an alert is not limited by external processing nodes, like the OSS.

Since the paging messages require a mobile device identifier (also called user device identifier or UEID) to be valid, there must be a function to provide this UEID set. The identifier can be either the International Mobile Subscriber Identity (IMSI) or the System Architecture Evolution Temporary Mobile Subscriber Identity (S-TMSI). Since this information is not available in the RBS, a UEID selector 202 must be in the core network or OSS. The efficiency of the solution can be determined by the choice of the UEID Selector algorithm. This algorithm should be chosen so as to be able to provide identifiers that have the highest probability to be in the coverage area of the given cell in an idle state.

A number of aspects can be taken into consideration in the selector algorithm. The selection could include mobile devices that have been observed in the given cell preceding the issuing of the alert. Further mobile devices can be included which are observed in the given cell based on historical traffic data (the given time of the day, the given day of the week, etc.). Also mobile devices which have been seen in other cells after having been seen in the given cell can be excluded from the UEID list. Additionally mobile devices which are known to be in the geographical area of the given cell, as discovered using information from other radio access technologies, e.g., a WiFi network, can be included in the list of UEIDs. The selector algorithm may also provide a priority ordering attached to the UEID list. This priority ordering may reflect the expected likelihood of receiving an answer from each mobile device.

The paging control function 204 initiates and sends the paging messages. In order to avoid unnecessary load in other parts of the network, it is important that the paging messages are sent in the given cell only and not in the whole tracking area containing the cell. If this function is in the RBS then the RBS 214, 216 can emulate a Non-access stratum (NAS) Paging message and send it to the given cell.

The UEID Selector 202 provides the list of UEIDs. In order to reduce the impact and cell load the Paging Control function 204 may first select a subset of the full list. This subset includes those UEIDs with the highest priority assigned and initiates paging to the selected set only. If there's no response from this set the paging is continued on further subsets. After having finished with all the mobile devices and if there is still no response to the paging message received, this function will signal to the SC Detector 200 or directly the Self-Organizing Network (SON) Actuator 206, indicating that the sleeping cell hypothesis is validated.

Additionally, there may be a trigger to a dedicated server to send IP data packets to the mobile devices (e.g. by using ping, or trying to open and close a TCP connection) to test that the data channels are also functioning. Also optionally, before initiating the paging procedures, the paging control function may change the cell reselection priorities in the geographical area of the given cell so that the priority of this cell is increased. At the same time, for geographically related cells potentially in other radio access technologies the cell reselection priority is decreased. In this way the idling mobile devices in the area will prioritize the given cell to attach to. This can increase the likelihood of these mobile devices being paged.

In the meantime, the SC Detector function 200 may continue to observe the traffic on the cell and if it detects any paging response it will abort the validation procedure and declare the cell as non-sleeping or not malfunctioning.

The SON Actuator function 206 receives the indication about the lack of any paging response. As a result, the actuator continues the sleeping cell procedure by sending an alarm to OSS or taking the appropriate action to recover the cell as described before.

Figure 3:
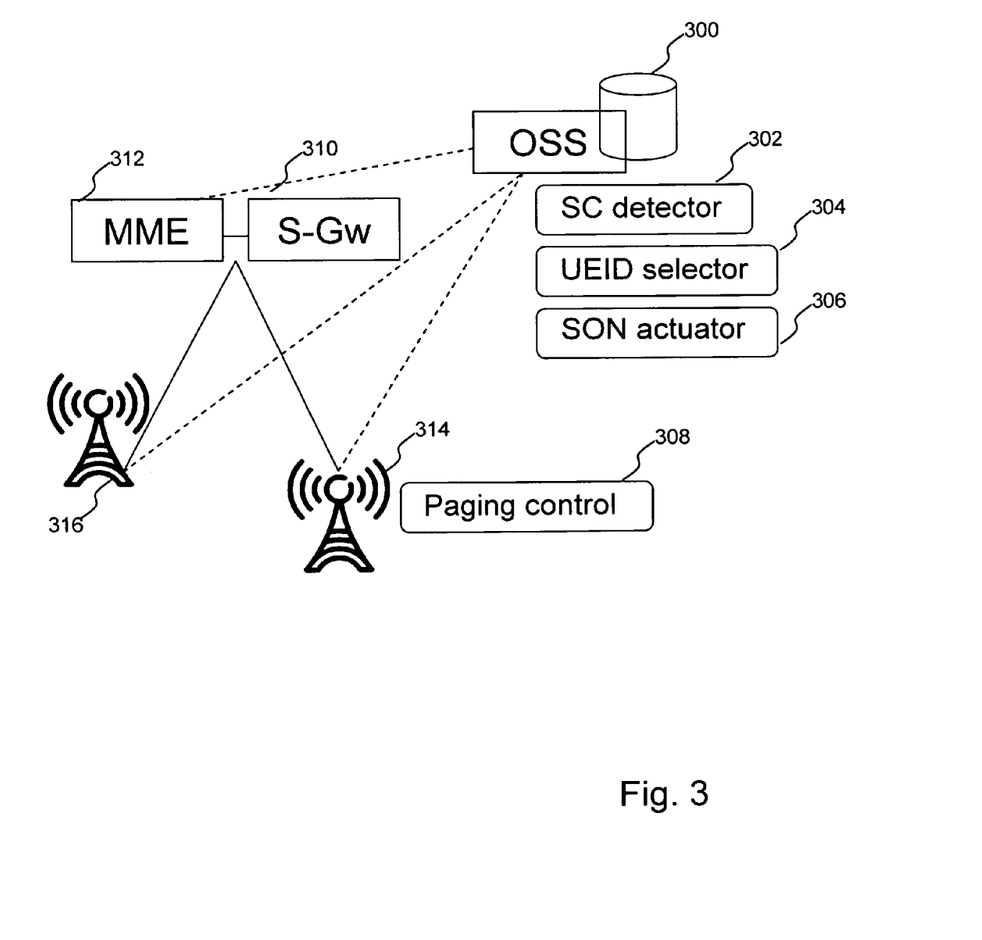
FIG. 3 shows an architectural embodiment based on an OSS.

A second architectural embodiment that can implement the proposed solution is based on the OSS, as shown in FIG. 3. In this case the SC detector 302 and SON Actuator 306 functions are placed in the OSS 300. The functions of the entities shown in FIG. 3 are the same with these as described for FIG. 2. The main difference is where these functions are implemented. The advantage of the setup of FIG. 3 is that both the detector 302 and the actuator 304 can be highly flexible and configurable since the algorithms and functions are running centralized in the OSS. The Paging Control 308 remains in the RBS since the OSS is not able to initiate paging procedures.

Figure 4:
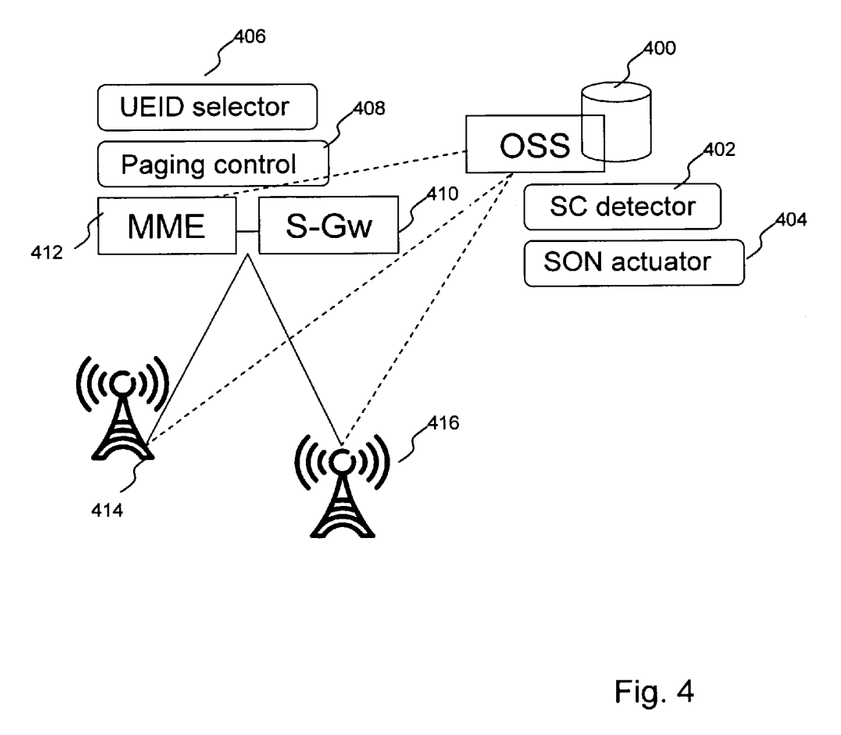
FIG. 4 shows an architectural embodiment based on an MME.

A third architectural embodiment that can implement the proposed solution is based on the Mobility Management Entity (MME), as shown in FIG. 3. In this implementation variant the Paging Control 406 and the UEID Selector 408 functions are implemented in the MME. The UEID Selector 408, being placed in the MME, can benefit from the database of mobile device contexts maintained by the MME as a core function. The MME has complete and up-to-date knowledge about mobility states (attached, idle, connected, etc.) of the mobile devices and also their location on RBS 416, 418 level.

The advantage of Paging Control 406 being implemented in the MME is that paging is a non-access stratum (NAS) functionality, which the MME is the responsible node for, so the implementation fits well in the core functions. As mentioned before the paging messages are sent to the potential sleeping cell in order to avoid paging flood in the whole tracking area where the cell belongs.

The implementation of the sleeping cell validation solution described up to here can be implemented in an LTE network, a WCDMA or a GSM/GPRS network.

Figure 5:
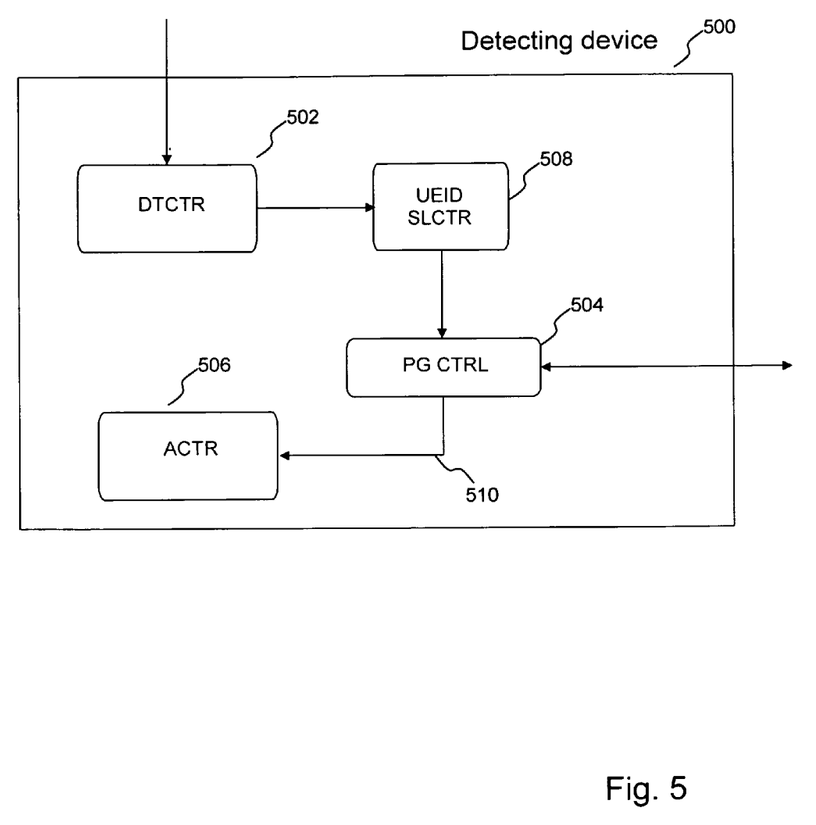
FIG. 5 shows a detecting device adapted to perform the invention.

FIG. 5 shows a detecting device which is adapted to implement the method described before. The detecting device comprises a detector 502. The detector 502 is responsible for detecting a lack of traffic in the cell. This can be achieved either by the detector itself or by receiving information on the lack of traffic from other nodes of the communications network. The device also comprises a selector 508 which is adapted to select at least one user identity identifying a user device. This user device is served by the cell. The selector 508 initiates the selection of the user device once the lack of traffic is detected by the detector 502.

The device further comprises a paging controller. The paging controller is adapted to send a paging message to the user device identified by the at least one selected user identity. The device finally comprises an actuator which is adapted to validate the malfunction of the cell in case no response message is sent by the user device to the paging message sent by the paging controller. For that purpose the paging controller informs the actuator for the reception or non-reception of a response to the paging message over connection 510.

The building blocks of the detecting device as presented above do not necessarily need to be implemented together in one entity. They can alternatively be implemented in separate entities of a communications network. For example the detector 502 and the actuator 506 can be part of an OSS node while the paging controller 504 and the selector 508 can be part of an MME node.

It is believed that many advantages of the invention described are fully understood from the provided description. It will be apparent though that various changes may be made in the form, construction, and arrangement of the exemplary embodiments without departing from the scope of the invention, or without sacrificing all of its advantages. Because the invention presented can be varied in many ways, it will be recognized that the invention should be limited only by the scope of the claims that follow.

The invention claimed is:

1. A method for detecting a malfunction in a cell of a telecommunication network, the cell being adapted to serve a plurality of user devices identified by user identities and handling signaling and/or data traffic between the network and the user devices, the method comprising:
   detecting a lack of traffic in the cell,
   based on the detecting, select at least one user identity identifying a user device, wherein the user device is in a coverage area of the cell, and wherein the at least one user identity belongs to a first list of user identities that are ordered according to a priority ordering,
   sending a paging message to the user device identified by the at least one selected user identity, and
   validating a malfunction of the cell responsive to a determination that no response message is sent by the user device in response to said paging message,
   wherein the priority ordering is configured to reflect an expected likelihood of receiving an answer from respective user identities of the first list of user identities.

2. The method of claim 1, wherein the at least one user identity further belongs to a second list of user identities different from the first list, and the first list or second list of user identities is compiled based on a probability of user devices being in the coverage area of the cell.

3. The method of claim 1, further comprising the step of issuing an alarm responsive to the determination that no response message is sent by the user device in response to said paging message.

4. The method of claim 1, wherein the first list or second list of user identities comprises user identities of user devices served by the cell before the detection of the lack of traffic in the cell.

5. The method of claim 1, wherein responsive to a determination that the response message is sent by the user device in response to said paging message, the cell is validated to not have a malfunction.

6. The method of claim 1, wherein, prior to sending the paging message to the user device identified by the at least one selected user identity, a first cell reselection priority of the cell is increased.

7. The method of claim 6, wherein, prior to sending the paging message to the user device identified by the at least one selected user identity, a second cell reselection priority of a second cell different from the first cell is decreased.

8. The method of claim 1, wherein selecting at least one user identity identifying the user device is performed by a first node of the telecommunication network, and
wherein sending the paging message to the user device is performed by a second node of the telecommunication network, different front the first node.

9. A computer program product comprising a non-transitory computer readable medium storing program code adapted when processed by a process performs the steps of the method according to claim 1.

10. A method for detecting a malfunction in a cell of a telecommunication network, the cell being adapted to serve a plurality of user devices identified by user identities and handling signaling and/or data traffic between the network and the user devices, the method comprising:
detecting a lack of traffic in the cell,
based on the detecting, selecting at least one user identity identifying a user device, wherein the user device is in a coverage area of the cell, and wherein the at least one user identity belongs to a first list of user identities that are ordered according to a priority ordering,
sending a paging message to the user device identified by the at least one selected user identity, and
validating a malfunction of the cell responsive to a determination that no response message is sent by the use device in response to said paging message,
wherein the priority ordering is compiled based on a probability of user devices being in the coverage area of the cell.

11. A detecting device for detecting a malfunction in a cell of a telecommunication network, the cell being adapted to serve a plurality of user devices identified by user identities and handling signaling and/or data traffic between the network and the user devices, the detecting device comprising:
a detector adapted to detect lack of traffic in the cell,
a selector adapted to select at least one user identity identifying a user device based on the detector detecting the lack of traffic in the cell, wherein the user device is in a coverage area of the cell, and wherein the at least one user identity belongs to a first list of user identities that are ordered according to a priority ordering,
a page controller adapted to send a paging message to the user device identified by the at least one selected user identity, and
an actuator adapted to validate a malfunction of the cell responsive to a determination that no response message is received from the user device in response to said paging message,
wherein the priority ordering is configured to reflect an expected likelihood of receiving an answer from respective user identities of the first list of user identities.

12. The detecting device of claim 11, wherein the priority ordering is compiled based on a probability of user devices being in the coverage area of the cell.

13. The detecting device of claim 11, wherein the at least one user identity further belongs to a second list of user identities, and the first list or second list of user identities is compiled based on a probability of user devices being in the coverage area of the cell.

14. The detecting device of claim 11, wherein the actuator further issues an alarm responsive to the determination that no response message is received from the user device in response to said paging message.

15. The detecting device of claim 11, wherein the first list or second list of user identities comprises user identities of user devices served by the cell before the detection of the lack of traffic in the cell.

16. The detecting device of claim 11, wherein the first list or second list of user identities comprises user identities of user devices which are in a geographical area of the cell.

17. The detecting device of claim 11, wherein the paging controller is further adapted to increase a first cell reselection priority of the cell prior to sending the paging message to the user device identified by the at least one selected user identity.

18. The detecting device of claim 17, wherein the paging controller is further adapted to decrease a second cell reselection priority of a second cell different from the first cell prior to sending the paging message to the user device identified by the at least one selected user identity.

* * * * *